Figure 1:
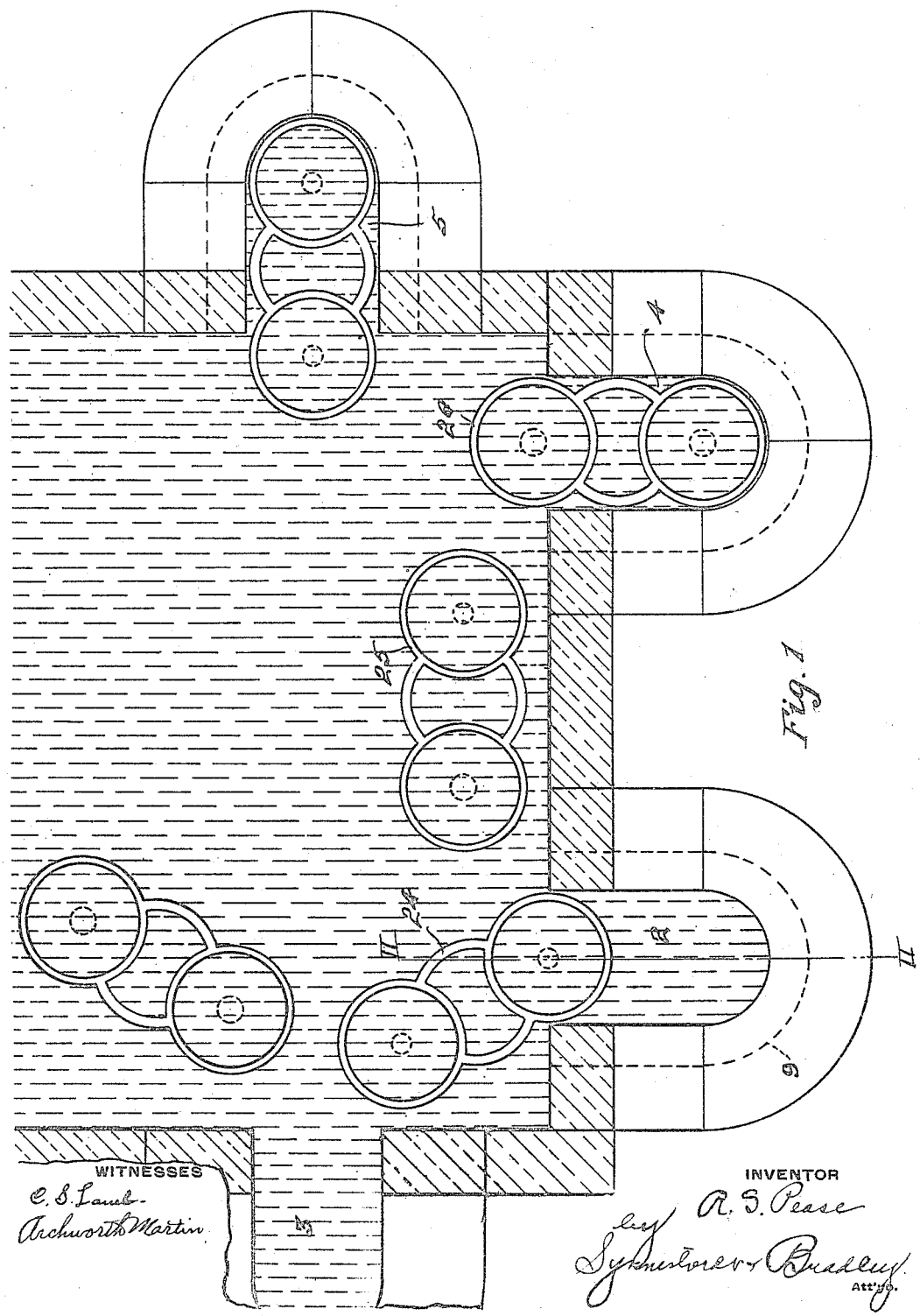

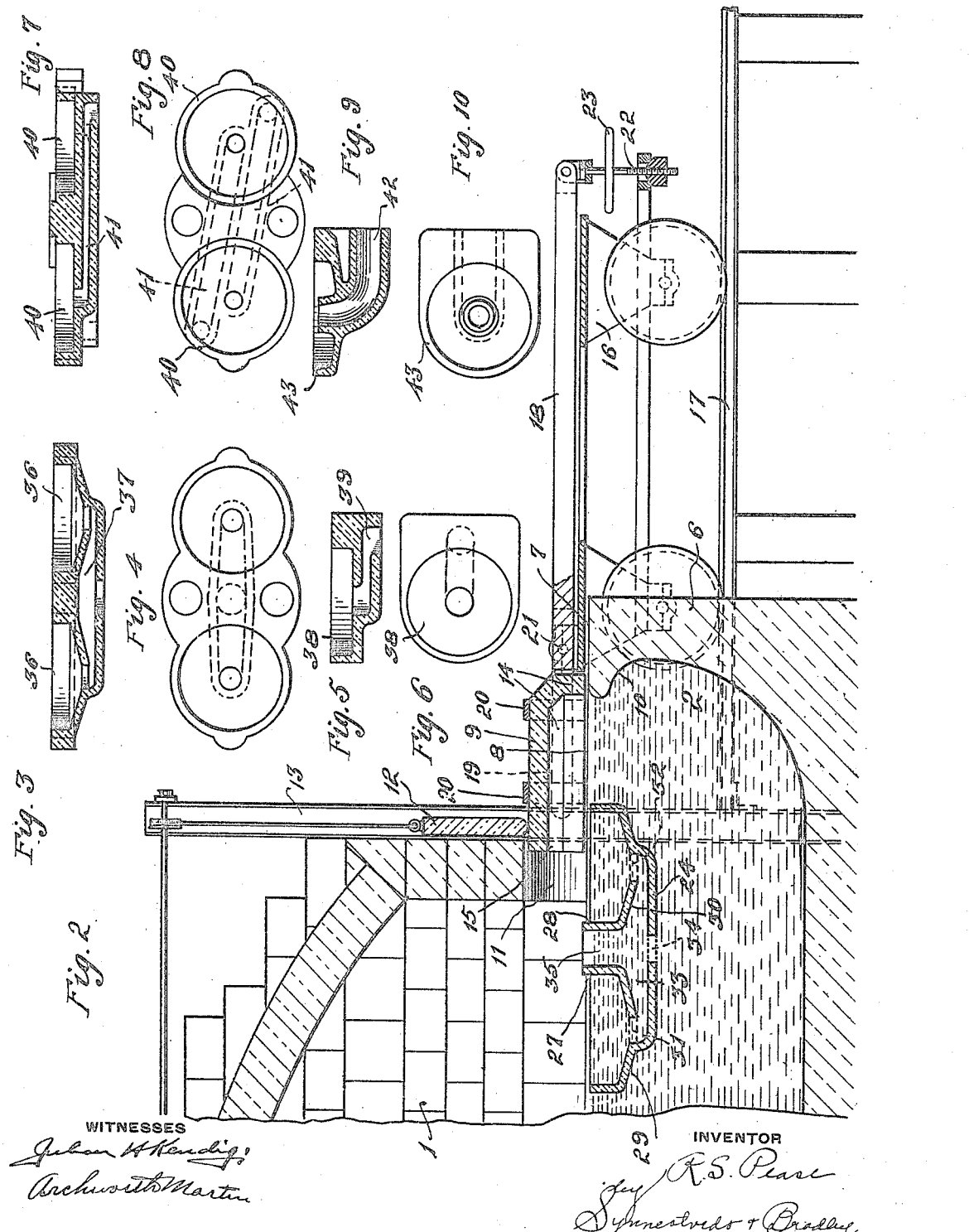

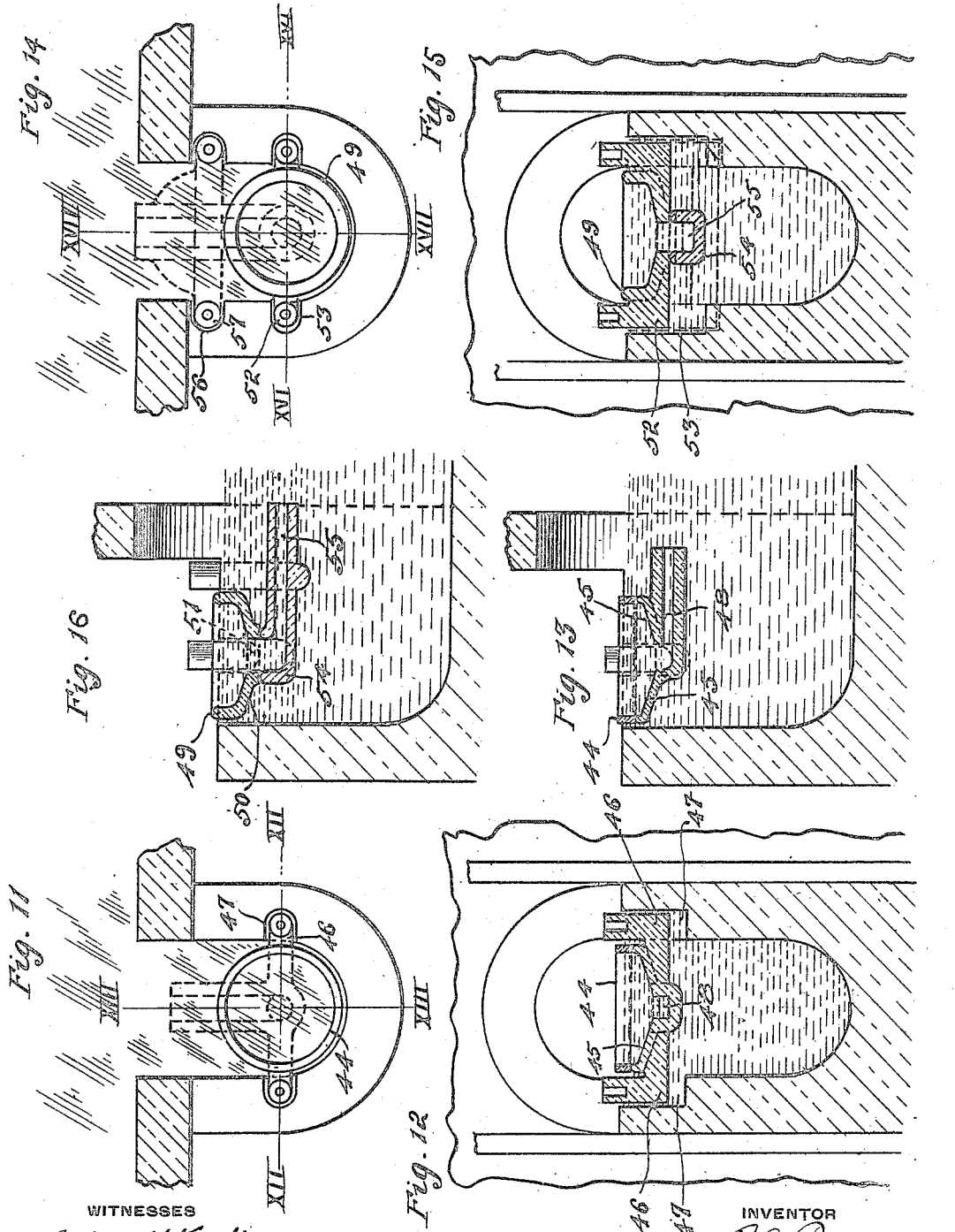

UNITED STATES PATENT OFFICE.

ROGER S. PEASE, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

GLASS-DRAWING.

1,152,833.      Specification of Letters Patent.      Patented Sept. 7, 1915.

Application filed February 5, 1914. Serial No. 816,780.

*To all whom it may concern:*

Be it known that I, ROGER S. PEASE, a citizen of the United States, residing at Pittsburgh, in the county of Allegheny and State of Pennsylvania, have invented certain new and useful Improvements in Glass-Drawing, of which the following is a specification.

The invention relates to the art of drawing glass cylinders. It has for its primary objects the provision of an arrangement for drawing from a tank furnace wherein the operations may be carried on more rapidly and economically than has heretofore been possible in tank drawing processes; the provision of an apparatus wherein cylinders having uniform thickness throughout are secured; the provision of an improved drawing ring construction, and the provision of an improved arrangement for handling the drawing rings. Certain embodiments of the invention are illustrated in the accompanying drawings, wherein—

Figure 17:
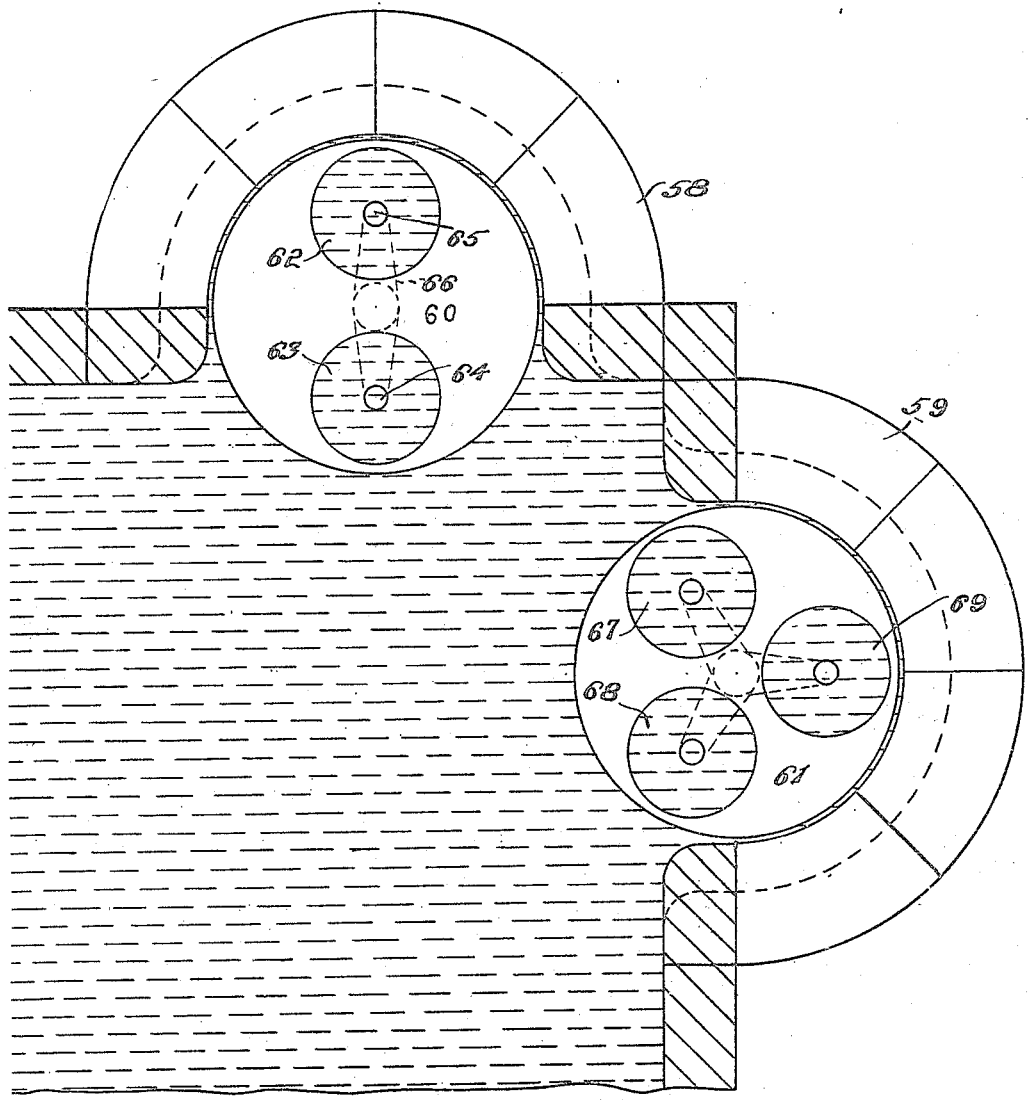

Figure 1 is a sectional plan view taken through a furnace built in accordance with my invention, such section being taken just above the top of the drawing extensions or tanks, Fig. 2 is a section on the line II—II of Fig. 1, but with the cover for the extension, and the operating car therefor which are not shown in Fig. 1, in position, Figs. 3 and 4 are sectional and plan views respectively of a modified type of floating drawing member which may be employed, Figs. 5 to 10 are similar views of other modifications of drawing members, Figs. 11, 12, and 13 illustrate a modification, Fig. 11 being a plan view, and Figs. 12 and 13 being sections taken on the lines XII—XII and XIII—XIII of Fig. 11, Figs. 14, 15, and 16 are views similar to those of Figs. 11, 12, and 13, but illustrate a modification, and Fig. 17 is a plan view of a modification.

Referring first to Figs. 1 and 2, 1 is the melting tank which may be of any approved type, and is heated by the usual regenerator means, not shown, and 2, 3, 4, and 5 (Fig. 1), are drawing extensions or tanks arranged around the sides of the melting tank and preferably of the same depth as the melting tank, as indicated in Fig. 2. The extensions or drawing tanks are all substantially the same in construction, so that a description of the tank or extension 2 shown in Fig. 2 will apply to the other extensions.

As indicated in Fig. 2, the extension 2 has side walls 6 whose top surfaces 7 terminate just above the surface of the glass, the purpose of this arrangement being to secure a very rapid cooling of the surface of the glass in the extension, when the cover 9 is removed, which rapid cooling could not be secured if the side walls of the extension extended a considerable distance above the surface of the glass, or if the extension was provided with a roof or top stone as has heretofore been used in the art, where drawing from a tank was attempted.

The upright walls 6 of the extension are preferably undercut as indicated at 10 (Fig. 2), the purpose being to provide a relatively large body of glass beneath the drawing surface 8. While it is desirable that the drawing surface 8 should cool very rapidly, it is essential that the body of glass lying beneath such drawing surface should remain very hot and fluid, and the undercutting of the walls to secure a large body of glass beneath the drawing surface tends to promote this condition.

Intermediate the melting tank 1 and its roofless extension 2 is a passage 11 for hot gases, such passage lying above the surface of the glass and being controlled by a gate 12. This gate 12 is preferably operated by means of the cable 13 which may be moved up and down by any desired means. The cover 9 is provided on three of its sides with depending walls 14, while its other side 15 is open and registers with the passage 11 when the cover is in the position indicated in Fig. 2. At this time the gate 12 is in raised position and the surface of the glass in the extension 2 is exposed to the hot gases from the furnace 1, thus securing a reheating of such surface if it should become necessary.

The cover 9 is preferably moved in and out by means of a truck 16 working upon rails 17. This truck is provided upon its upper face with a bar 18 carrying at its front end a fork 19. This fork straddles the cover 9, the sides of the fork passing through loops provided by the metal bands 20 which are rigidly secured to the cover. The bar 18 is pivoted at 21 and is adapted to be tilted by means of the screw member 22 provided with the handle 23. When it is desired to remove the cover the wheel 23 is rotated to cause the fork 19 to lift the cover slightly, after which the truck is moved to the rear. When desired, the fork 19 can be disengaged from the loops at the sides of the cover and the truck used for the handling of other covers. This is the preferred method of handling the cover which might be moved in and out by the use of a large variety of other means.

Floating in the glass are a plurality of drawing members 24, 25, and 26 (Figs. 1 and 2), such drawing members being all similar in construction, so that a description of one will suffice. Each drawing member comprises a pair of drawing rings 27 and 28 provided with the bottom closures 29 and 30 which are perforated as indicated in 31 and 32, and communicate with the conduit 33. This conduit 33 communicates with the body of glass beneath the ring, by means of the passage 34. Intermediate the two rings is a cavity 35 which contains a relatively large body of glass the purpose of which is to assist in maintaining a more uniform temperature in the two drawing rings.

In operation the drawing member occupies the position indicated by the member 26 in Fig. 1, at which time the outer drawing ring is in position in the outer end of the drawing extension, while the inner ring is exposed to the heat of the melting tank and lies within such melting tank. At this time the cover of the extension is removed and the gate is down, so that the glass in the ring from which the drawing occurs is substantially cut off from all heat from the melting tank. A cylinder is drawn from the drawing ring in the usual way, after which it is cut off at the bottom by means of a torch or some other severing means, or by raising the gate and exposing the lower end of the cylinder to the hot gases from the passageway 11, such hot gases serving to melt off the bottom of the cylinder, after which it is taken down in the usual way. After this operation the drawing member is floated out into the melting tank and conducted to the next drawing extension, the ring of the drawing member from which no draw had occurred, being moved into drawing position in such second extension. During the preceding drawing operation it occupied a position in the melting tank and the glass therein was thoroughly heated and refined. It will be also noted that in this transfer of the drawing member from the one extension to the other no reversal of the drawing member was required. During the second drawing operation the ring from which the draw had previously occurred is of course now positioned in the melting tank and exposed to the heat of such tank, so that by the time the drawing is completed from the other ring the glass in the ring in the melting tank is thoroughly heated and refined, thus disposing of the cold glass and the lower end of the cylinder remaining after the preceding draw.

During the drawing operation a fresh supply of glass is provided in the ring, by reason of the opening in the bottom of the ring and the conduit 33 leading to the body of glass below the ring. The supply of glass in the ring is thus augmented by a fresh supply of hot glass as the drawing progresses. The temperature of the body of glass in the ring is uniform throughout, so that a cylinder having walls of uniform thickness throughout is secured. As indicated in Fig. 1, the drawing ring when in drawing position substantially fills the end of the drawing extension, so that the cylinder is shielded from the radiation of heat from beneath, and the amount of heat radiated from the drawing tank is reduced to a minimum, thus tending to conserve the heat of the body of glass beneath the drawing member and maintain it in its fluid condition.

My invention contemplates either shifting the drawing member after each drawing operation, whereby a ring full of hot glass is brought in from the melting tank for each draw, or else maintaining the drawing member continuously in its one position and drawing a plurality of cylinders without shifting the position of the floating drawing member. In such latter method of procedure it would probably be necessary to skim off the residue of the cylinder after each draw, and then position the cover 9 as indicated in Fig. 2, with the gate 12 raised, thus exposing the surface of the glass in the ring to the heat from the melting tank. The preferred procedure, however, contemplates the shifting of the drawing member after each draw. The cover 9 may be positioned as indicated in Fig. 2 during such shifting operation, in order to avoid radiation of heat from the extension, or in other cases it may be found desirable to use the cover only at infrequent intervals when the drawing operation is to be suspended for a relatively long period, or when it is found desirable to heat up the glass in the extension and render it more fluid.

It will be seen that although the shifting operation brings a very hot body of glass into position for drawing in the drawing tank, only a relatively short period need expire before the drawing operation commences, since the hot glass in the ring is so segregated and protected from the heat of the furnace that it cools to the necessary fluidity with great rapidity. This cooling operation is also augmented by reason of the free exposure of the glass in the ring to the cooling action of the atmosphere, there being no roof or side walls projecting a considerable distance above the surface of the glass to prevent such access of the atmosphere to the surface of the glass. It will be seen that the usual losses of time incident to remelting in a tank furnace and incident to permitting the cooling of the surface of the glass preliminary to drawing are largely eliminated, only a very short period of time being required to bring a new ring into position and permit the glass therein to cool to the desired temperature for drawing.

Figs. 3 and 4 illustrate a modification of the drawing member, such drawing member comprising the two rings 36 with the conduit 37 for fresh glass, the construction differing from that of Fig. 2 in that the cavity 35 is omitted.

In the construction of Figs. 5 and 6 only a single drawing ring is provided, such drawing ring being provided with a conduit 39 leading laterally from the opening in the center of the ring. This construction lacks certain of the advantages of the double ring, but retains the advantage of the passage 39 leading laterally from the drawing ring. This advantage resides in the fact that the fresh glass required in the ring instead of being drawn from directly beneath the ring is drawn from a point nearer to the melting tank. As a result hotter and more fluid glass is secured.

Figs. 7 and 8 illustrate a modification wherein two drawing rings 40 are employed, such rings being supplied with separate conduits 41 instead of having a common conduit as in the construction of Fig. 3. This construction has the advantage that the glass supplied during the drawing operation comes from a point farther in the melting tank than is the case in the previous constructions.

Figs. 9 and 10 illustrate a modification of the drawing member of Figs. 5 and 6, the distinction residing primarily in that the conduit 42 opens into the ring 43 at a point above the bottom of the ring.

Figs. 11 to 13 illustrate a still further modification of the construction illustrated in Figs. 1 and 2. The cover and gate are the same in this construction as in the construction of Figs. 1 and 2, but the drawing member involves a considerable departure. This drawing member consists of a ring portion 44 and a body portion 45. The body portion 45 is intended to always remain in the position illustrated, being provided with a pair of lugs 46 mounted in guide-ways 47 in the upper portion of the walls of the extension. The body portion 45 is provided with a laterally extending conduit 48 by means of which relatively hot glass is supplied to the interior of the member during the drawing operation. After each drawing operation the ring 44 is floated back into the melting chamber and a new ring is brought into position. The residue of cold glass is thus disposed of and relatively hot glass brought into position for drawing. If the contents of the member require reheating the cover 9 may be employed, as heretofore indicated.

Figs. 14, 15, and 16 illustrate a modification differing somewhat from that of Figs. 11, 12, and 13. In this construction the ring portion 49 is provided with a bottom closure 50 having an opening 51 therethrough, and this ring member 49 is designed to be maintained constantly in the position illustrated, and is not floated back into the melting tank. To this end it is provided with a pair of lug members 52 fitting loosely in grooves 53 in the side walls of the drawing extension, thus permitting a slight rocking movement and a free vertical movement. A bottom member 54 is provided with a conduit 55 registering with the opening in the bottom of the ring 49, such conduit serving to bring a supply of hot glass to the interior of the drawing as the drawing progresses. This member 54 is also provided with laterally extending trunnion-like members 56 fitting loosely in the grooves 57 in the side walls of the drawing extension.

Fig. 17 illustrates a modified form of tank and drawing members. The extensions 58 and 59 are semicircular and the drawing members 60 and 61 rotate, and aside from such rotation always occupy the positions illustrated. The member 60 has two drawing receptacles or rings 62 and 63 provided with bottom openings 64 and 65 connected to a laterally extending conduit 66 communicating at its central portion with the body of glass beneath the drawing members, a section through the member being substantially the same as that illustrated in Fig. 3. After drawing from the ring 62 the member is rotated to bring such ring into the melting tank and the ring 63 into position for drawing. The other drawing member 61 is similar to the member 60 with the exception that it has three drawing rings 67, 68, and 69, instead of two rings. It will be understood that the invention is not limited to the various specific embodiments illustrated, nor to the formation of cylinders, but that the structures may be modified, and that by suitable changes other shapes aside from cylinders may be formed.

What I claim is:

1. In combination, a glass melting tank with a main heated portion roofed over and a drawing extension having an open top, and with the side walls thereof terminating adjacent the surface of the glass and a drawing ring floating in the glass in said extension, the said ring lying with the glass therein exposed to the cooling action of the air outside the tank and having a bottom with an opening therethrough and a conduit extending laterally from said opening toward the main heated portion of the said tank.

2. In combination, a glass melting tank with a main heated portion roofed over and a drawing extension having an open top, and with the side walls thereof terminating adjacent the surface of the glass and a drawing member floating in the body of glass and comprising two drawing rings, one lying in the said extension with the glass therein exposed for drawing into glass cylinders and the other lying in the main heated portion of the tank, the said rings each having a bottom closure with an opening therethrough and a conduit connected to the said opening and extending to the other ring and communicating with the main body of glass outside the drawing member.

3. In combination, a main glass melting tank, a pair of similar drawing extensions with open tops leading therefrom, and with the side walls thereof terminating adjacent the surface of the glass and a floating drawing member comprising a pair of drawing rings constructed so that when one ring is in an extension in position for drawing the other ring is in the melting tank, the said drawing member being adapted to be floated from one extension to the other.

4. In combination in cylinder forming apparatus, a glass melting tank with its main portion roofed over and having a roofless extension, and with the side walls thereof terminating adjacent the surface of the glass and a drawing ring in the extension having a bottom closure and an open top so that an area of glass greater than that of the cross sectional area of the cylinder drawn is exposed to the cooling action of the atmosphere, the said ring having a conduit extending toward the main portion of the tank and adapted to supply glass to the interior of the ring.

5. In combination in cylinder forming apparatus, a glass melting tank with its main portion roofed over and having a roofless extension, and with the side walls thereof terminating adjacent the surface of the glass and a drawing ring in the extension having a bottom closure and an open top so that an area of glass greater than that of the cross sectional area of the cylinder drawn is exposed to the cooling action of the atmosphere, the walls of the said extension at its end at the surface of the glass being formed on a curve so as to fit the curved outer surface of the ring.

In testimony whereof I have hereunto signed my name in the presence of the two subscribed witnesses.

ROGER S. PEASE.

Witnesses.
ARCHWORTH MARTIN,
JULIAN H. KENDIG.

Copies of this patent may be obtained for five cents each, by addressing the "Commissioner of Patents, Washington, D. C."